US011091677B2

(12) United States Patent
Franken et al.

(10) Patent No.: US 11,091,677 B2
(45) Date of Patent: Aug. 17, 2021

(54) REACTIVE POLYURETHANE HOT MELT ADHESIVES CONTAINING FILLERS

(71) Applicant: Henkel AG & Co. KGaA, Duesseldorf (DE)

(72) Inventors: Uwe Franken, Dormagen (DE); Karin Jonscher, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/032,543

(22) Filed: Jul. 11, 2018

(65) Prior Publication Data

US 2018/0320037 A1 Nov. 8, 2018

Related U.S. Application Data

(63) Continuation of application No. PCT/EP2016/079723, filed on Dec. 5, 2016.

(30) Foreign Application Priority Data

Jan. 13, 2016 (DE) .......................... 102016200282.1

(51) Int. Cl.
| | | |
|---|---|---|
| C09J 175/12 | (2006.01) | |
| C09J 175/06 | (2006.01) | |
| C08G 18/42 | (2006.01) | |
| C08G 18/76 | (2006.01) | |
| C09J 5/06 | (2006.01) | |
| C09J 11/04 | (2006.01) | |
| C08K 3/40 | (2006.01) | |
| C08K 7/20 | (2006.01) | |
| C08L 67/00 | (2006.01) | |

(52) U.S. Cl.
CPC ........ *C09J 175/12* (2013.01); *C08G 18/4202* (2013.01); *C08G 18/4211* (2013.01); *C08G 18/4238* (2013.01); *C08G 18/7671* (2013.01); *C09J 5/06* (2013.01); *C09J 11/04* (2013.01); *C09J 175/06* (2013.01); *C08G 2170/20* (2013.01); *C08K 3/40* (2013.01); *C08K 7/20* (2013.01); *C08K 2201/005* (2013.01); *C08L 67/00* (2013.01)

(58) Field of Classification Search
CPC ...................................... C09J 175/12
See application file for complete search history.

(56) References Cited

U.S. PATENT DOCUMENTS

| | | | |
|---|---|---|---|
| 4,623,709 A | 11/1986 | Bauriedel | |
| 5,525,663 A | 6/1996 | Oien | |
| 6,515,164 B1 | 2/2003 | Bolte et al. | |
| 6,903,167 B2 | 6/2005 | Bolte et al. | |
| 8,357,453 B2 | 1/2013 | Onuoha | |
| 8,865,842 B2 | 10/2014 | Krebs et al. | |
| 9,790,341 B2 | 10/2017 | Barriau et al. | |
| 2005/0020706 A1 | 1/2005 | Kollbach et al. | |
| 2006/0210808 A1 | 9/2006 | Hung et al. | |
| 2006/0269758 A1 | 11/2006 | Helmeke | |
| 2007/0129525 A1 | 6/2007 | Eichelmann et al. | |
| 2007/0155859 A1* | 7/2007 | Song ...................... C08G 18/10 523/218 |
| 2015/0322314 A1 | 11/2015 | Franken et al. | |

FOREIGN PATENT DOCUMENTS

| | | | |
|---|---|---|---|
| CN | 101033384 A | 9/2007 | |
| CN | 101443428 A | 5/2009 | |
| CN | 102690625 A | 9/2012 | |
| CN | 103031100 A | 4/2013 | |
| CN | 103180356 A | 6/2013 | |
| CN | 104204059 A | 12/2014 | |
| CN | 104937003 A | 9/2015 | |
| CN | 105602514 A | 5/2016 | |
| DE | 102007023982 A1 * | 11/2008 | .............. C09J 11/08 |
| DE | 102007023982 A1 | 11/2008 | |
| EP | 0150444 A2 | 8/1985 | |
| EP | 0951493 B1 | 6/2001 | |
| EP | 1341832 B1 | 10/2016 | |
| JP | H10504598 A | 5/1998 | |
| JP | 2004307788 A * | 11/2004 | |
| JP | 2004307788 A | 11/2004 | |
| JP | 2006116443 A | 5/2006 | |
| JP | 2007031706 A | 2/2007 | |
| JP | 2008069310 A | 3/2008 | |
| WO | 2005097861 A1 | 10/2005 | |
| WO | 2013129142 A1 | 9/2013 | |
| WO | 2014186316 A1 | 11/2014 | |

OTHER PUBLICATIONS

DIN 53240-1:Jun. 2013.
DIN 55672-1:Aug. 2007.
EN ISO 10523:Apr. 2012.
ISO787, Teil 7).
DIN 66115.
ISO 13320:2009.
DIN EN ISO 11909:May 2007.
DIN EN ISO 255:Jan. 2000.
International Search Report for International PCT Patent Application No. PCT/EP2016/079723 dated Feb. 17, 2017.
Study on preparing polyurethane adhesive for auto-reflective stickers, edited by Cao Qifeng et al., China Adhesives, vol. 21, No. 5, pp. 38-40 and 52.
Plastic Formulation Design, edited by Wang Wenguang et al., p. 402, Chemical Industry Press, Sep. 1998, the first edition.
Synthetic Adhesive, edited by Wei Yuezhen et al., p. 52, People's Education Press, Oct. 1979, the first edition.

\* cited by examiner

*Primary Examiner* — Daniel H Lee
(74) *Attorney, Agent, or Firm* — James E. Piotrowski

(57) ABSTRACT

The present invention relates to a reactive polyurethane (PUR) hot-melt adhesive, in particular a moisture cross-linking 1K-PUR hot-melt adhesive, wherein the PUR adhesive contains neutralized hollow glass spheres as fillers. The invention also relates to the use of said adhesive for adhesively bonding substrates.

20 Claims, No Drawings

REACTIVE POLYURETHANE HOT MELT ADHESIVES CONTAINING FILLERS

The present invention relates to a reactive polyurethane (PUR) hot-melt adhesive, in particular a moisture-crosslinking one-component polyurethane hot-melt adhesive (1K-PUR hot-melt adhesive), the PUR adhesive containing neutralized hollow glass spheres as fillers, and to the use of the adhesive for adhesively bonding substrates.

Reactive polyurethane hot-melt adhesives (PUR), in particular those that are moisture crosslinking, are generally known in industry. These are mainly solvent-free, crosslinking adhesives that are used to adhesively bond a plurality of planar substrates, such as decorative films, woven textile fabrics, paper films, ABS films, expanded PVC films, wooden panels, wood-fiber shaped bodies or metal foils, with one another. Very generally, reactive hot-melt adhesives of this kind are used for demanding adhesive bonds that require a high level of strength and high heat resistance of the adhesive bond. The crosslinking takes place either by supplying energy, i.e. additional heating, or, as already mentioned above, by means of moisture, in order to thus result in an infusible adhesive. Reactive moisture-curing hot-melt adhesives have been widely used in industrial practice and are applied from the melt in the manner of thermoplastic hot-melt adhesives. After said melt has been applied, joined to the substrate parts to be adhesively bonded and cooled, the hot-melt adhesive sets physically and rapidly by means of the solidification thereof. This is followed, in the case of the moisture-reactive hot-melt adhesives, by a chemical reaction of the reactive groups that are still present with the moisture from the surroundings, resulting in a crosslinked and infusible adhesive. The aim is generally to design the reactive hot-melt adhesives, for example on the basis of moisture-crosslinking reactive polyurethanes, such that both the initial strength by means of solidification and the final strength by means of moisture crosslinking is accomplished as rapidly as possible so that the joined components can either be further processed or finally brought into use.

Fillers are conventionally used in adhesive systems of this kind in order to reduce density. In this case, in particular hollow glass spheres are important, since these are distinguished by high shear, pressure and temperature stability. However, for isocyanate-containing preparations having terminal isocyanate groups, such as the known 1K-PUR hot-melt adhesives, the alkaline nature of the commercial hollow glass spheres that are customary in the market leads to a significantly limited storage and processing stability, which, for the PUR hot-melt adhesives, results in extremely rapid increases in viscosity and even complete gelation. A similar behavior can be observed when using polymer microcapsules, as described in DE 10 2007 023 982 A1. In addition, polymer microcapsules of this kind have drawbacks with respect to the shear, pressure and temperature stability.

Furthermore, the use of acids for stabilizing NCO-functional compounds is known. A method is thus disclosed in EP 0 856 551 A1, in which polyphosphoric acid is used to stabilize NCO-functional compounds. U.S. Pat. No. 3,179,625 describes a method for producing heat-stable isocyanate-terminated polyurethane prepolymers, in which an acid having a dissociation constant of more than $1 \times 10^{-5}$, for example phosphoric acid, phosphorous acid or pyrophosphoric acid, is used. EP 0 764 670 A1 and WO 96/06122 disclose reactive polyurethane-based hot-melt adhesives comprising borosilicate hollow glass spheres. It is described that sodium borate is exuded from the surfaces of the borosilicate hollow glass spheres, which can lead to an increase in the alkalinity and to a trimerization of isocyanates. In order to prevent this, strong acids, for example phosphoric acid or sulfuric acid, are added to the adhesive formulation. However, it has now been shown that adding acids to adhesive formulations often does not provide sufficient stabilization. Furthermore, the addition of acids leads to a retardation of the curing reaction of the adhesive, which is undesirable. In addition, the use of acids, in particular strong inorganic acids, is generally undesirable in the industrial production of adhesives owing to the health and safety risks associated therewith and the safety precautions that are therefore additionally required.

There is therefore a need for formulations which do not have these drawbacks and exhibit, when using corresponding fillers, similar storage and processing stabilities to the corresponding filler-free formulations.

It has now surprisingly been found that hollow glass spheres that have been neutralized result in highly stable formulations having the desired density.

In a first aspect, the invention therefore relates to a reactive polyurethane-based hot-melt adhesive composition containing, based on the total weight of the adhesive composition, from 1 to <30 wt. %, preferably 1 to <10 wt. %, particularly preferably 2 to 6 wt. % of at least one solid particulate filler, characterized in that the at least one filler comprises neutralized hollow glass spheres, the hollow glass spheres, as a 5 wt. % dispersion in water at 20° C., in particular having a pH of less than 9.0, preferably less than 8.5, more preferably from 6 to 8, most preferably from 6.5 to 7.5.

In another aspect, the invention relates to the use of the hot-melt adhesive compositions described herein for adhesively bonding two or more substrates, to a method for adhesively bonding two or more substrates, the hot-melt adhesive compositions described herein being applied to one or more of the substrates to be adhesively bonded, and to the substrates thus obtained.

Unless indicated otherwise, the molecular weights indicated in the present text refer to the number average of the molecular weight (Mn). The molecular weight Mn can be determined based on an end group analysis (hydroxyl number according to DIN 53240-1:2013-06 or NCO content according to EN ISO 11909), or by means of gel permeation chromatography (GPC) according to DIN 55672-1:2007-08 with THF as an eluent. Except where indicated otherwise, the listed molecular weights are those which are determined by means of GPC. The weight average of the molecular weight Mw can also be determined by means of GPC, as indicated previously.

In relation to an ingredient, the expression "at least one" refers to the type of ingredient and not to the absolute number of molecules. "At least one polyol" thus means, for example, at least one type of polyol, i.e., that one type of polyol or a mixture of a plurality of different polyols can be used. Together with weight data, the expression refers to all compounds of the indicated type that are contained in the composition/mixture, that is to say that the composition does not contain any other compounds of this type beyond the indicated amount of the corresponding compounds.

Unless explicitly indicated otherwise, all percentages that are cited in connection with the compositions described herein refer to wt. % with respect to the relevant mixture.

"About" or "approximately" as used herein in connection with a numerical value refer to the numerical value ±10%, preferably ±5%.

The fillers used are solid particles at room temperature (20° C.) and normal pressure (1013 mbar). The fillers are hollow glass spheres, which are distinguished with respect to the typically commercially obtainable hollow glass spheres that are used as fillers in that they are neutralized, i.e. do not have a highly alkaline nature. This can be determined, for example, by the pH of a 5 wt. % (w/w) dispersion of the corresponding hollow glass spheres in demineralized water at 20° C. being measured by means of ISO 10523:2012-04 and being in particular less than 9.0, preferably less than 8.5, more preferably from 6 to 8, most preferably from 6.5 to 7.5.

Hollow glass spheres of this kind can be produced, for example, by treating the surface with a suitable acid, for example phosphoric acid. Suitable hollow glass spheres can be obtained, for example, from 3M™ under the product name Glass Bubbles iM30K-N.

In various embodiments, the hollow glass spheres used may have the conventional particle sizes and particle size distributions used for the described intended use. In various embodiments, the hollow glass spheres have an average particle size $d_{50}$ of from 5 to 50 μm. In order to determine the particle size or particle size distribution, various methods are available, i.a. sieve analysis (according to ISO787, Part 7), sedimentation analysis (according to DIN 66115) and determination by means of laser light diffraction according to ISO standard 13320:2009(E) (corrected version dated 01.12.2009).

In addition, it is preferred for the fillers to be present in the form of substantially spherical particles, i.e. spheres, and in particular not in the form of plates or needles/fibers. The hollow glass spheres are in particular spheres that are hollow on the inside and have thin walls and preferably consist of borosilicate glass. The density is typically in the range of from 0.5 to 0.8 $g/cm^3$, in particular is about 0.6 $g/cm^3$. In various embodiments, the alkalinity is ≤0.5 milli eq/g.

Polyurethane adhesives are generally known. The adhesives suitable according to the invention are 1K polyurethane adhesives or 2K polyurethane adhesives. The adhesives are in particular hot-melt adhesives. The adhesives may contain solvent, but they are preferably solvent-free. The crosslinking of the polyurethane adhesives that are suitable according to the invention is based on the reaction of reactive NCO groups with H-acidic functional groups, for example OH groups, amino groups or carboxyl groups. An alternative crosslinking method involves the reaction of the NCO groups with moisture from the applied adhesive, the substrate, or the surroundings with formation of urea groups. These crosslinking reactions are known and they may also proceed concurrently. In order to accelerate reactions of this kind, catalysts can be introduced into the adhesive, for example amine, titanium or tin catalysts.

In preferred embodiments, the adhesive is a 1K polyurethane adhesive. An adhesive of this kind may contain at least one NCO-terminated polyurethane prepolymer as the resin component and cures by reaction of the NCO groups with moisture from the applied adhesive, the substrate, or the surroundings.

The isocyanate(NCO)-terminated polyurethane (PU) prepolymers of the resin component are obtained by reacting a polyol or a polyol mixture with a stoichiometric excess of polyisocyanate. The polyols used when producing the prepolymer may be all polyols that are usually used for polyurethane synthesis, for example polyester polyols, polyether polyols, polyester ether polyols, polycarbonate polyols or mixtures of two or more thereof.

Polyether polyols may be produced from a plurality of alcohols, which contain one or more primary or secondary alcohol groups. As an initiator for the production of polyethers that do not contain any tertiary amino groups, the following compounds or mixtures of said compounds can be used by way of example: water, ethylene glycol, propylene glycol, glycerol, butanediol, butanetriol, trimethylolethane, pentaerythritol, hexanediol, 3-hydroxyphenol, hexenetriol, trimethylolpropane, octanediol, neopentyl glycol, 1,4-hydroxymethyl cyclohexane, bis(4-hydroxyphenyl)dimethylmethanes and sorbitol. Ethylene glycol, propylene glycol, glycerol and trimethylolpropane are preferably used, particularly preferably ethylene glycol and propylene glycol, and, in a particularly preferred embodiment, propylene glycol is used.

As cyclic ethers for producing the above-described polyethers, alkylene oxides such as ethylene oxide, propylene oxide, butylene oxide, epichlorohydrin, styrene oxide or tetrahydrofuran or mixtures of these alkylene oxides may be used. Propylene oxide, ethylene oxide or tetrahydrofuran or mixtures thereof are preferably used. Propylene oxide or ethylene oxide or mixtures thereof are preferably used. Propylene oxide is most particularly preferably used.

Polyester polyols can be produced for example by reacting low molecular weight alcohols, in particular ethylene glycol, diethylene glycol, neopentyl glycol, hexanediol, butanediol, propylene glycol, glycerol, or trimethylolpropane with caprolactone. 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol are also suitable as polyfunctional alcohols for producing polyester polyols.

Further suitable polyester polyols may be produced by polycondensation. Difunctional and/or trifunctional alcohols having an insufficient amount of dicarboxylic acids or tricarboxylic acids or mixtures of dicarboxylic acids or tricarboxylic acids, or reactive derivatives thereof, may thus be condensed to form polyester polyols. Suitable dicarboxylic acids are, for example, adipic acid or succinic acid or dodecanedioic acid and higher homologs thereof having up to 16 carbon atoms, also unsaturated dicarboxylic acids such as maleic acid or fumaric acid and aromatic dicarboxylic acids, in particular isomeric phthalic acids, such as phthalic acid, isophthalic acid or terephthalic acid. Suitable tricarboxylic acids are for example citric acid or trimellitic acid. The aforementioned acids can be used individually or as mixtures of two or more thereof. Particularly suitable alcohols are hexane diol, butane diol, ethylene glycol, diethylene glycol, neopentyl glycol, 3-hydroxy-2,2-dimethylpropyl-3-hydroxy-2,2-dimethylpropanoate or trimethylolpropane or mixtures of two or more thereof. Polyester polyols having a high molecular weight include for example the reaction products of polyfunctional, preferably difunctional, alcohols (optionally together with small amounts of trifunctional alcohols) and polyfunctional, preferably difunctional carboxylic acids. Instead of free polycarboxylic acids, the corresponding polycarboxylic acid anhydrides or corresponding polycarboxylic acid esters can also be used (where possible) with alcohols having preferably 1 to 3 carbon atoms. The polycarboxylic acids can be aliphatic, cycloaliphatic, aromatic or heterocyclic, or both. They can optionally be substituted, for example by alkyl groups, alkenyl groups, ether groups or halogens. Suitable polycarboxylic acids are, for example, succinic acid, adipic acid, suberic acid, azelaic acid, sebacic acid, dodecanedioic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimer fatty acid or trimer fatty acid, or mixtures of two or more thereof.

Polyesters that can be obtained from lactones, for example based on epsilon-caprolactone, also referred to as "polycaprolactone", or hydroxycarboxylic acids, for example omega-hydroxy caproic acid, can also be used.

However, polyester polyols of oleochemical origin can also be used. Polyester polyols of this kind can be produced, for example, by complete ring opening of epoxidized triglycerides of a fat mixture that contains an at least partially olefinically unsaturated fatty acid and has one or more alcohols having 1 to 12 carbon atoms and subsequent partial transesterification of the triglyceride derivatives to form alkyl ester polyols having 1 to 12 carbon atoms in the alkyl group.

Polycarbonate polyols can be obtained, for example, by reacting diols such as propylene glycol, butanediol-1,4 or hexanediol-1,6, diethylene glycol, triethylene glycol or tetraethylene glycol or mixtures of said diols with diaryl carbonates, for example diphenyl carbonates, or phosgene.

The molecular weight of the polyols used for synthesizing the prepolymer is preferably in the range of from 100 to 20,000 g/mol, in particular 330 to 4,500 g/mol. The average functionality can be in the range of from 2 to 4.5. The PU prepolymer preferably comprises a polyether/polyester backbone.

The stoichiometric excess of polyisocyanate, based on the molar ratio of NCO to OH groups, is in particular 1:1 to 2.5:1, preferably 1:1 to 2:1 and particularly preferably 1.05:1 to 1.8:1.

The known coating or adhesive polyisocyanates may be used, these being polyisocyanates having two or more isocyanate groups. Suitable polyisocyanates are, for example, 1,5-naphthylene diisocyanate (NDI), 2,4- or 4,4'-diphenylmethane diisocyanate (MDI), hydrogenated MDI (H12MDI), xylylene diisocyanate (XDI), tetramethyl xylylene diisocyanate (TMXDI), di- and tetra alkylene diphenylmethane diisocyanate, 4,4'-dibenzyl diisocyanate, 1,3- or 1,4-phenylene-diisocyanate, toluylene diisocyanate (TDI), 1-methyl-2,4-diisocyanato-cyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, methylene triphenyl triisocyanate (MIT), phthalic acid-bis-isocyanato-ethylester, trimethylhexamethylene diisocyanate, 1,4-diisocyanatobutane, 1,12-diisocyanatododecane and dimer fatty acid diisocyanate.

Suitable at least trifunctional isocyanates are polyisocyanates which are obtained by trimerization or oligomerization of diisocyanates or by reaction of diisocyanates with low molecular weight polyfunctional compounds containing hydroxyl or amino groups. Commercially available examples are trimerization products of the isocyanates HDI, MDI or IPDI or adducts of diisocyanates and low molecular weight triols, such as trimethylolpropane or glycerol. Further examples include isocyanurates of hexamethylene diisocyanate (HDI) and isocyanurates of isophorone diisocyanate (IPDI).

Aliphatic, cycloaliphatic, or aromatic isocyanates may in principle be used, but aromatic isocyanates are particularly suitable on account of the reactivity. Examples of suitable diisocyanates are methylene diphenyl diisocyanates (MDI), such as 4,4'-methylene diphenyl diisocyanate, 2,4'-methylene diphenyl diisocyanate or 2,2'-methylene diphenyl diisocyanate.

PU prepolymers may be produced in a known manner from the above-mentioned polyols and polyisocyanates. A prepolymer containing NCO groups may here be produced from the polyols and isocyanates. Examples thereof are described in EP-A951493, EP-A1341832, EP-A 150444, EP-A 1456265 and WO 2005/097861.

The at least one NCO-terminated PU prepolymer is preferably an aromatic isocyanate-terminated, more preferably MDI-terminated polyurethane prepolymer of a polyester polyol mixture and an aromatic diisocyanate, such as MDI.

The corresponding prepolymers usually have an NCO content of from 0.25 to 5 wt. % (determined according to Spielberger, DIN EN ISO 11909:2007-05), preferably 0.25 to 4 wt. %, and have an average NCO functionality of from 2 to 3, in particular 2.

On account of the excess of isocyanate used, the NCO-terminated PU prepolymers usually contain certain amounts of isocyanate monomers, i.e. in particular aromatic polyisocyanate monomers, for example MDI, typically in amounts of from 0.1 to 1 wt. % based on the total weight of prepolymers and monomers. However, it is preferable for the amount of polyisocyanate monomers to be <1 wt. %, more preferably <0.1 wt. %. For example, known methods can be used to remove unreacted monomeric polyisocyanates. This can occur, for example, by precipitating or trapping the monomeric isocyanates. In a preferred embodiment, the unreacted monomers are removed by distilling off the monomers in a vacuum, for example in a thin-film evaporator.

The molecular weight (Mn) of the prepolymer is in the range of from 300 to 20,000 g/mol, preferably less than 12,000, in particular less than 8,000 g/mol.

Die adhesive systems described herein are preferably 1K systems that are moisture-crosslinking.

The described adhesive systems contain the above-described prepolymers for example in amounts of from 20 to 95 wt. %, preferably 50 to 95 wt. %, more preferably 70 to 90 wt. %, based on the total weight of the adhesive composition.

The hot-melt adhesives may also contain at least one thermoplastic polyester. The molecular weight of the thermoplastic polyester is intended to be below 6,000 g/mol. The polyesters only need to have a low functionality and may contain only a low number of NCO-reactive groups. The amount can be selected such that no double-ended chain lengthening of the prepolymers occurs. The polyesters are intended to contain, per polyester chain, on average fewer than 1.4 groups that are reactive with NCO groups. In a preferred embodiment, said polyesters are intended to contain, per polyester chain, on average less than 1 group that is reactive with NCO groups; in particular said polyesters are intended to be substantially free of NCO-reactive groups. In another preferred embodiment, the polyesters are intended to contain, per polyester chain, on average less than 1.4 but more than 1 group that is reactive with NCO groups.

Possible polyesters are the known polyesters based on reaction products of polyfunctional, preferably difunctional, alcohols, optionally together with small amounts of trifunctional alcohols, and polyfunctional, preferably difunctional and/or trifunctional, carboxylic acids. Suitable ester derivatives can also be used. Polyesters known per se can be used.

Polyesters based on aliphatic carboxylic acids are particularly suitable, particularly preferably predominantly linear polyesters.

The functionality of the thermoplastic polyesters can be decreased. This can be achieved by means of various measures. For example, the number of OH— or COOH— containing terminal groups can be decreased, even during synthesis, by adding monovalent alcohols. A different procedure reduces the number of functional groups of the polyesters by polymer-analogous reactions. For example, it is possible to decrease OH or COOH groups by reaction with carboxylic acid halides. The reaction can be easily achieved owing to the high reactivity of derivatives of this kind. In another procedure, functional groups that are present are reacted with esters or orthoesters. By removing the volatile reaction products, a reaction can be promoted and the number of reactive groups decreased. In a further suitable procedure, functional groups that are present are reacted with carboxylic acid anhydrides. Optionally, it is also possible to add proportions of solvents in order to facilitate the reaction. These can then be removed again, optionally together with by-products, by distillation in a vacuum.

In a preferred embodiment, OH or COOH groups that are present are reacted with monovalent isocyanates. Monoisocyanates such as phenyl isocyanate, tosyl isocyanate or stearyl isocyanate are particularly suitable. These can be added in amounts up to about equimolar amounts, for example with an NCO:OH ratio of from approximately 0.3:1 to 1.02:1, in particular up to 0.98:1, and react with the thermoplastic polyesters to form urethane groups. An excess of these monomeric isocyanates should be avoided. The number of NCO-reactive groups can thus be reduced by the reaction.

The amount of thermoplastic polyesters in the hot-melt adhesive can be 3 to 35 wt. %, in particular 5 to 25 wt. %. The polyesters are preferably those based on crystalline or semicrystalline polyester diols. However, amorphous polyester diols may also be used. In a particular embodiment, linear polyesters of this kind that also have urethane groups are used. For example, suitable thermoplastic polyesters can contain a urethane group or, in particular, on average two urethane groups. Linear polycaprolactone copolyester polyurethanes, as can be obtained for example from Lubrizol Advanced Materials under the trade name Pearlbond® 501, are an example.

Selecting the used thermoplastic polyesters which have fewer reactive groups can ensure that the adhesive according to the invention has a correspondingly low viscosity. Furthermore, selecting the polyester makes a low melting point possible, and therefore a suitable application viscosity can be obtained even at low temperatures.

The adhesive according to the invention may also contain the usual additives. The additional components are, for example, tackifying resins (tackifiers), adhesion promoters, crosslinking agents or viscosity regulators, pigments, plasticizers, stabilizers and/or catalysts, waxes or antioxidants.

For example, abietic acid, abietic acid esters, terpene resins, terpene phenol resins, phenol-modified styrene polymers, phenol-modified α-methylstyrene polymers or hydrocarbon resins can be used as tackifying resins. Known metalorganic and/or amine catalysts in amounts up to 2%, for example the metalorganic compounds of tin, iron, titanium, or bismuth, such as tin(II) salts of carboxylic acids or the dialkyltin(IV) carboxylates, are suitable as catalysts. For example, antioxidants, such as the commercially available sterically hindered phenols and/or thioethers and/or substituted benzotriazoles, or the sterically hindered amines of the HALS type, are used as stabilizers. In special compositions, plasticizers can in particular also be added. These are non-reactive plasticizers, for example naphthenic mineral oils, polypropylene oligomers, polybutene oligomers, polyisobutylene oligomers, polyisoprene oligomers, hydrogenated polyisoprene oligomers and/or polybutadiene oligomers, benzoate esters, phthalates, adipates, or hydrocarbon oils. Typical adhesion promoters are, for example, ethylene/acrylamide comonomers, polymeric isocyanates, reactive organosilicon compounds or phosphorous derivatives; silanes that contain hydrolyzable groups are also particularly suitable. Pigments can likewise be contained in small amounts. Waxes can be of natural origin, optionally also in chemically modified form, or of synthetic origin. Vegetable waxes and animal waxes can be used as natural waxes; mineral waxes or petrochemical waxes are also suitable. In total, the additives can be contained in the adhesive in an amount of up to 25 wt. %.

A hot-melt adhesive according to the invention contains in particular 20 to 95 wt. % of at least one NCO-terminated prepolymer, preferably having a molecular weight below 12,000 g/mol, as a reaction product of polyether diols, polyester diols, and/or polyalkylene diols and an excess of aromatic diisocyanates, 3 to 35 wt. % of a thermoplastic polyester having a molecular weight (Mn) below 6,000 g/mol and comprising fewer than 1.4 NCO-reactive groups, 2 to 6 wt. % of the hollow glass spheres described herein as filler, and up to 25 wt. % additives. The sum of the components is intended to equal 100 wt. %.

The adhesives described herein may contain solvents or may be solvent-free. However, the adhesives are preferably substantially solvent-free. "Substantially free", as used herein, means that the composition contains less than 1 wt. %, preferably less than 0.5 wt. % of the corresponding component.

The polyurethane hot-melt adhesives according to the invention are liquid at application temperatures and typically solid at room temperature as hot-melt adhesives. In various embodiments, the compositions described herein at a temperature of 130° C. have a viscosity of from 2,000 to 60,000, in particular 40,000 mPas determined according to DIN EN ISO 2555:2000-01 (Brookfield viscometer RV DV-II, spindle no. 27, 130° C.; 5 rpm). In this case, the NCO content of the adhesive may be between 0.25 and 4 wt. %.

In various embodiments, the adhesives described herein are characterized in that they have an increase in viscosity (dynamic viscosity according to Brookfield, determined as described above) after 16 h at 130° C. of no more than 400%, preferably no more than 250%.

In various embodiments, the described hot-melt adhesives have a density of ≤1.5 g/cm³, preferably 0.8 to 1.5 g/cm³, more preferably 0.9 to 1.2 g/cm³, most preferably 0.9 to 1.1 g/cm³.

The hot-melt adhesive according to the invention is suitable for bonding various substrates. In particular, the low application viscosity makes it possible to also bond substrates that are temperature-sensitive, for example sensitive films, plastics, paper and similar substrates. An adhesive according to the invention can therefore be applied at low temperatures of, for example, below 150° C., in particular also from 90 to 130° C. The viscosity enables good flow onto the substrate. The adhesive then cools, becomes solid, and crystallizes. Adhesion to the substrate rapidly becomes established, and the adhesively bonded substrate can be further processed quickly. Since the adhesives remain in the molten state in the reservoir tank for a long time during the conventional processing thereof, it is advantageous for the viscosity to remain constant and also for the adhesive to be easily processed.

After cooling, the hot-melt adhesive according to the invention preferably has a rapid build-up of adhesion in the adhesive layer. Substrates bonded with a hot-melt adhesive can therefore be quickly further processed, and the final chemical crosslinking reaction under the influence of moisture can occur later. The final hardness and cohesion of the adhesive according to the invention then becomes established. There is good adhesion to a variety of substrates. An adhesive according to the invention is suitable for adhesive bonding in book-binding, for example. Adhesives according to the invention can furthermore be used to adhesively bond packaging made of paper, board, or films.

The adhesives are applied to the substrates to be adhesively bonded using conventional aggregates and using all commonly used application methods, for example by spraying, doctoring, or roller coating mechanisms. After application, the substrates to be adhesively bonded are adhesively bonded together in a known manner.

The polyurethane adhesives according to the invention are in particular suitable as adhesives for flexible, planar substrates. In this case, the adhesive according to the invention is applied to a substrate. The application amount is here usually 1-5 g/m². The substrate is then adhesively bonded to a second substrate made of the same or another material under pressure.

The invention therefore also relates to the use of the adhesives described herein for adhesively bonding two or more substrates, as described above, to methods for adhesively bonding substrates of this kind, in which the adhesive is applied to one or more of the substrates to be adhesively bonded and said substrates are then adhesively bonded, and to the substrates thus obtained.

It shall be readily understood that all embodiments disclosed herein in connection with the PU adhesive can also be used for the uses and methods described, and vice versa.

The invention shall be described in further detail below with reference to several examples. Amounts specified therein refer to wt. %, unless otherwise specified.

EXAMPLES

Example 1 (According to the Invention)

In a heated and stirred tank reactor, a reactive hot-melt adhesive composition having free isocyanate groups was prepared from the following components:

| | |
|---|---|
| Polyester 1 (of adipic acid and hexanediol-1,6, OH number 30) | 10 wt. % |
| Polyester 2 (of dodecanedioic acid and hexanediol-1,6, OH number 30) | 30 wt. % |
| Polyester 3 (of phthalic acid, isophthalic acid and neopentyl glycol, OH number 30) | 38 wt. % |
| Thermoplastic polyurethane (TPU, Pearlbond ® 501, Lubrizol) | 5 wt. % |
| Hollow glass spheres (neutralized, 3M Glass Bubbles iM30K-N) | 5 wt. % |
| 4,4'-MDI (diphenylmethane diisocyanate) | 12 wt. % |

In addition, the polyesters 1-3 were melted at 130° C. and then, together with the TPU and the hollow glass spheres, filled into the heatable stirred tank reactor and dehydrated to a moisture content of <200 ppm under vacuum at 130° C., the melt being visually checked for homogeneity. The reaction vessel was then aerated with nitrogen and the calculated amount of 4,4'-MDI was added while the stirrer was stationary and at 120-130 ° C. This was then stirred at 100 rpm, a vacuum was applied and the temperature was kept at 120-130° C. The reaction time was 30 minutes. The reaction was then terminated, the degassed product immediately decanted into a moisture-tight sealable container and the NCO content (NCO content according to EN ISO 11909: 2007-05), density and viscosity (according to DIN EN ISO 2555:2000-01 using a Brookfield viscometer RV DV-II, spindle no. 27, 130° C., 5 rpm) were determined. The density was 1.05 g/cm³. The viscosity increased by 200% over 16 h at 130° C.

The pH of the hollow glass spheres (5 wt. % in demineralized water) at 20° C. was 7.0 (determined according to EN ISO 10523:2012-04).

Example 2 (Comparative Example)

In a heated and stirred tank reactor, a reactive hot-melt adhesive composition having free isocyanate groups was prepared from the following components:

| | |
|---|---|
| Polyester 1 (adipic acid and hexanediol-1,6, OH number 30) | 10 wt. % |
| Polyester 2 (dodecanedioic acid and hexanediol-1,6, OH number 30) | 30 wt. % |
| Polyester 3 (phthalic acid, isophthalic acid and neopentyl glycol, OH number 30) | 38 wt. % |
| Thermoplastic polyurethane (TPU, Pearlbond ® 501, Lubrizol) | 5 wt. % |
| Hollow glass spheres (non-neutralized, 3M Glass Bubbles VS 5500) | 5 wt. % |
| 4,4'-MDI (diphenylmethane diisocyanate) | 12 wt. % |

The composition was prepared as described in Example 1. The density of the product was 1.07 g/cm³. The viscosity significantly increased at 130° C. and the product was already gelled and unusable after 1.5 h (increase >500%).

The pH of the hollow glass spheres (5 wt. % in demineralized water) at 20° C. was 9.5 (determined according to EN ISO 10523:2012-04).

Example 3 (Comparative Example)

In a heated and stirred tank reactor, a reactive hot-melt adhesive composition having free isocyanate groups was prepared from the following components:

| | |
|---|---|
| Polyester 1 (adipic acid and hexanediol-1,6, OH number 30) | 11 wt. % |
| Polyester 2 (dodecanedioic acid and hexanediol-1,6, OH number 30) | 32 wt. % |
| Polyester 3 (phthalic acid, isophthalic acid and neopentyl glycol, OH number 30) | 40 wt. % |
| Thermoplastic polyurethane (TPU, Pearlbond ® 501, Lubrizol) | 5 wt. % |
| 4,4'-MDI (diphenylmethane diisocyanate) | 12 wt. % |

The composition was prepared as described in Example 1. The density of the product was 1.20 g/cm³. The viscosity increased by 210% over 16 h at 130° C.

Example 4 (Comparative Example)

In a heated and stirred tank reactor, a reactive hot-melt adhesive composition having free isocyanate groups was prepared from the following components:

| | |
|---|---|
| Polyester 1 (adipic acid and hexanediol-1,6, OH number 30) | 10 wt. % |
| Polyester 2 (dodecanedioic acid and hexanediol-1,6, OH number 30) | 32 wt. % |
| Polyester 3 (phthalic acid, isophthalic acid and neopentyl glycol, OH number 30) | 40 wt. % |
| Thermoplastic polyurethane (TPU, Pearlbond ® 501, Lubrizol) | 5 wt. % |
| Polymer microcapsules (Expancell DU80, Akzo Nobel) | 1 wt. % |
| 4,4'-MDI (diphenylmethane diisocyanate) | 12 wt. % |

The composition was prepared as described in Example 1. The density of the product was 1.08 g/cm$^3$. The viscosity significantly increased at 130° C. and the product was already gelled and unusable after 1.5 h (viscosity no longer measurable).

Example 5 (Comparative Example)

In a heated and stirred tank reactor, a reactive hot-melt adhesive composition having free isocyanate groups was prepared from the following components:

| | |
|---|---|
| Polyester 1 (adipic acid and hexanediol-1,6, OH number 30) | 10 wt. % |
| Polyester 2 (dodecanedioic acid and hexanediol-1,6, OH number 30) | 30 wt. % |
| Polyester 3 (phthalic acid, isophthalic acid and neopentyl glycol, OH number 30) | 37.95 wt. % |
| Thermoplastic polyurethane (TPU, Pearlbond ® 501, Lubrizol) | 5 wt. % |
| Hollow glass spheres (non-neutralized, 3M Glass Bubbles K20) | 5 wt. % |
| Phosphorous acid (H$_3$PO$_3$) | 0.05 wt. % |
| 4,4'-MDI (diphenylmethane diisocyanate) | 12 wt. % |

The composition was prepared as described in Example 1. The density of the product was 1.07 g/cm$^3$. The viscosity significantly increased at 130° C. and the product was already gelled and unusable after 2 h (increase >500%). The addition of acids therefore does not provide sufficient stabilization.

The invention claimed is:

1. A reactive polyurethane-based hot-melt adhesive composition containing, based on the total weight of the adhesive composition, from 1 to <30 wt. % of at least one solid particulate filler, wherein the at least one filler comprises neutralized hollow glass spheres, the hollow glass spheres, as a 5 wt. % dispersion in water at 20° C., having a pH of 6 to 9.

2. The hot-melt adhesive composition according to claim 1, containing, based on the total weight of the adhesive composition, from 1 to <10 wt. % of neutralized hollow glass spheres.

3. The hot-melt adhesive composition according to claim 1, containing, based on the total weight of the adhesive composition, from 2 to 6 wt. % of neutralized hollow glass spheres.

4. The hot-melt adhesive composition according to claim 1, wherein the hollow glass spheres, as a 5 wt. % dispersion in water at 20° C., have a pH of from 6 to 8.

5. The hot-melt adhesive composition according to claim 1, wherein the hollow glass spheres, as a 5 wt. % dispersion in water at 20° C., have a pH of from 6.5 to 7.5.

6. The hot-melt adhesive composition according to claim 1, wherein the at least one filler has an average particle size d$_{50}$ of from 5 to 50 μm.

7. The hot-melt adhesive composition according to claim 1, wherein the hot-melt adhesive composition contains at least one NCO-terminated polyurethane prepolymer.

8. The hot-melt adhesive composition according to claim 1, wherein the hot-melt adhesive composition contains at least one NCO-terminated polyurethane prepolymer in an amount of from 20 to 95 wt. % based on the total weight of the hot-melt adhesive composition.

9. The hot-melt adhesive composition according to claim 1, comprising an MDI-terminated polyurethane prepolymer reaction product of a polyester polyol mixture and MDI.

10. The hot-melt adhesive composition according to claim 1, wherein the hot-melt adhesive is a moisture-curing 1K polyurethane hot-melt adhesive.

11. The hot-melt adhesive composition according to claim 1, wherein the composition further contains at least one thermoplastic polyester in an amount of from 3 to 35 wt. %, based on the total weight of the hot-melt adhesive composition.

12. The hot-melt adhesive composition according to claim 1, wherein the composition further contains at least one thermoplastic polyester, in an amount of from 5 to 25 wt. %, based on the total weight of the hot-melt adhesive composition.

13. The hot-melt adhesive composition according to claim 1, wherein the hot-melt adhesive composition:
(a) has a viscosity of from 2,000 to 60,000 mPas determined according to DIN EN ISO 2555:2000-01 (Brookfield viscometer RV DV-II, spindle no. 27, 130° C.; 5 rpm); and/or
(b) has an NCO-content of from 0.25 to 4 wt. %; and/or
(c) has a density of ≤1.5 g/cm$_3$.

14. The hot-melt adhesive composition according to claim 1, wherein the hot-melt adhesive composition has a density of 0.9 to 1.1 g/cm$^3$.

15. The hot-melt adhesive composition according to claim 1, wherein the hot-melt adhesive composition has an increase in viscosity after 16 h at 130° C. of no more than 400%.

16. The hot-melt adhesive composition according to claim 1, wherein the hot-melt adhesive composition has an increase in viscosity after 16 h at 130° C. of no more than 250%.

17. The hot-melt adhesive composition according to claim 1, wherein:
(a) the composition further contains one or more additives selected from tackifying resin, tackifier, adhesion promoter, crosslinking agent, viscosity regulator, pigment, plasticizer, stabilizer, catalyst, wax or antioxidant; and/or
(b) the composition is substantially free of organic solvent.

18. Cured reaction products of the hot-melt adhesive composition according to claim 1 for adhesively bonding two or more substrates.

19. A substrate bonded to cured reaction products of the hot-melt adhesive composition according to claim 1.

20. A reactive polyurethane-based hot-melt adhesive composition comprising, based on the total weight of the adhesive composition, from 1 to <30 wt. % of neutralized hollow glass spheres, wherein the hollow glass spheres, as a 5 wt. % dispersion in water at 20° C., have a pH of less than 9.0.

* * * * *

UNITED STATES PATENT AND TRADEMARK OFFICE
CERTIFICATE OF CORRECTION

| | |
|---|---|
| PATENT NO. | : 11,091,677 B2 |
| APPLICATION NO. | : 16/032543 |
| DATED | : August 17, 2021 |
| INVENTOR(S) | : Franken et al. |

It is certified that error appears in the above-identified patent and that said Letters Patent is hereby corrected as shown below:

In the Claims

Column 11, Lines 46-47 change "pH of 6 to 9" to --pH of from 6 to 9--.

Signed and Sealed this
Twenty-sixth Day of April, 2022

Katherine Kelly Vidal
*Director of the United States Patent and Trademark Office*